United States Patent [19]

Lang

[11] 4,098,166

[45] Jul. 4, 1978

[54] ANCHORING MEMBER SECURED BY AN ADHESIVE MATERIAL

[75] Inventor: Gusztav Lang, Munich, Germany

[73] Assignee: Hilti Aktiengesellschaft, Schaan, Liechtenstein

[21] Appl. No.: 719,148

[22] Filed: Aug. 31, 1976

[30] Foreign Application Priority Data

Sep. 1, 1975 [DE] Fed. Rep. of Germany ....... 2538821

[51] Int. Cl.² .............................................. F16B 13/04
[52] U.S. Cl. ............................................ 85/63; 85/83
[58] Field of Search ............... 85/63, 83, 84, 23, 44, 85/42, 20, 22, 65, 68, 82; 151/41.7, 14.5, 37; 156/92, 145; 61/45 B

[56] References Cited

U.S. PATENT DOCUMENTS

| 488,195 | 12/1892 | Goldie | 85/44 X |
|---|---|---|---|
| 730,139 | 6/1903 | Macaulay | 85/44 X |
| 2,690,879 | 10/1954 | Snyder | 85/23 X |
| 3,022,701 | 2/1962 | Potruch | 85/44 X |
| 3,897,713 | 8/1975 | Gugle | 85/42 |
| 3,940,941 | 3/1976 | Libert et al. | 85/63 X |
| 3,945,294 | 3/1976 | Jarman | 85/63 |

FOREIGN PATENT DOCUMENTS

| 2,205,289 | 8/1973 | Fed. Rep. of Germany | 85/63 |
| 866,997 | 1/1962 | United Kingdom | 85/84 |

*Primary Examiner*—Ramon S. Britts
*Attorney, Agent, or Firm*—Toren, McGeady and Stanger

[57] ABSTRACT

In an anchoring assembly which is secured in a borehole in a receiving material by a hardenable adhesive material, the assembly includes an anchoring member and a guide ring through which the member is driven into the borehole. One of the anchoring member and guide ring is provided with a helically shaped projection while the other has a helically shaped groove formed in it for interengagement with the projection. As axial force is imparted to the anchoring member and it is driven through the guide ring into the borehole, the interengagement of the helically shaped projection and groove causes the anchoring member to rotate as well as to move axially.

19 Claims, 8 Drawing Figures

Fig. 1a
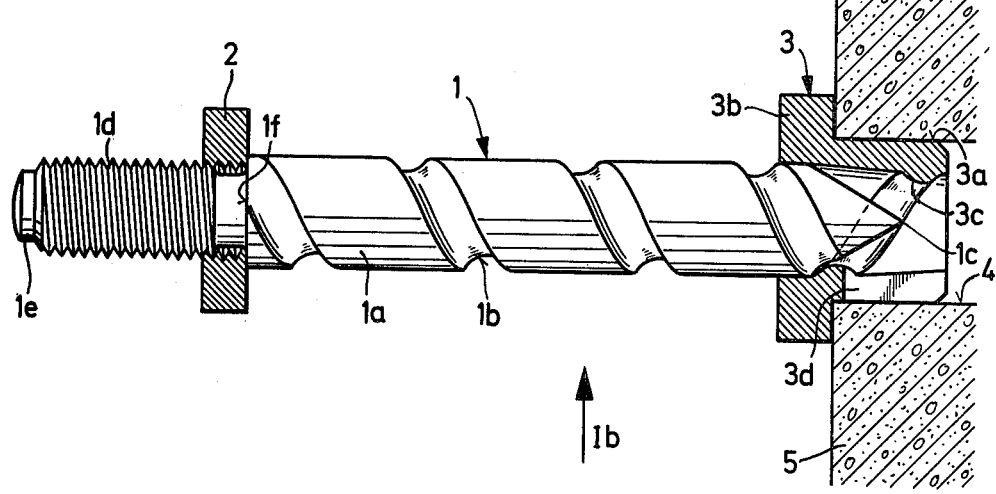
Fig. 1b
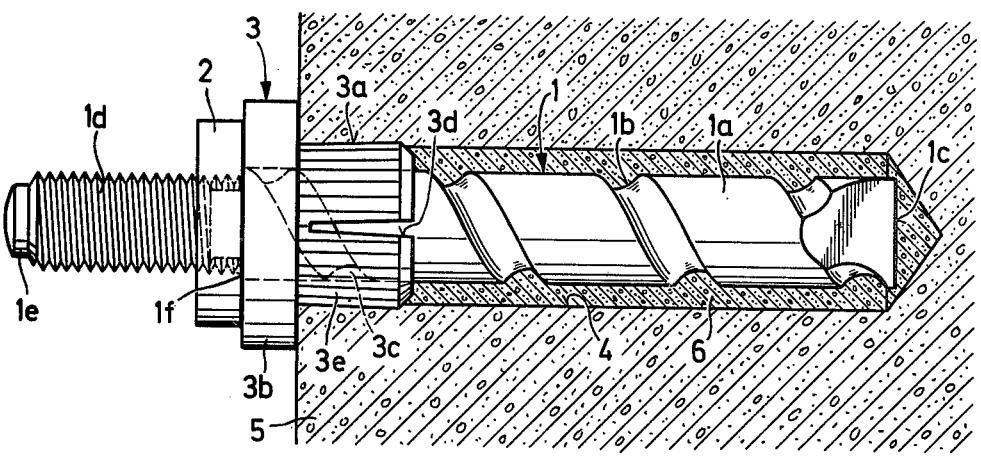
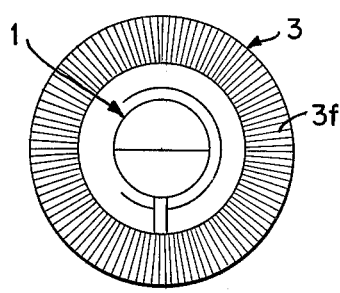
Fig. 1c
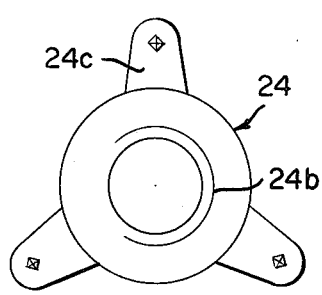
Fig. 3a
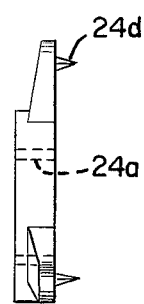
Fig. 3b

ANCHORING MEMBER SECURED BY AN ADHESIVE MATERIAL

SUMMARY OF THE INVENTION

The invention is directed to the construction of an anchoring member which is secured in a borehole by an adhesive material as well as to the manner in which the anchoring member is inserted into the borehole. More specifically, the anchoring member is driven axially through a guide ring into the borehole and an interengagement is provided between the anchoring member and the guide ring so that the axial force applied to the anchoring member is converted, in part, into a rotational force.

In known anchoring members which are secured within a borehole by an adhesive material, the required amount of adhesive material is introduced into the borehole, for example, in a destructible cartridge. The cartridge contains the two components of a two-component adhesive material and, if necessary, it also includes fillers of mostly mineral composition. After the introduction of the adhesive into the borehole, the anchoring member, which is frequently threaded over its axial length, is driven into the borehole. When the anchoring member is driven in, however, the adhesive components are only mixed with one another in the axial direction. As a result incomplete mixing of the components takes place and in most cases there is incomplete hardening of the adhesive material. Accordingly, it is very important that the anchoring member impart an additional rotary movement to the adhesive as it is inserted to obtain adequate extraction values for the anchoring member.

There are other known anchoring assemblies where the individual components of the adhesive material are separated into individual capsules. The components are mixed with each other in the encapsuled form. The hardening action is initiated by destroying the capsule walls by means of the anchoring member. Since there is a certain amount of play between the anchoring member and the wall of the borehole, it is advisable in this arrangement if, in addition to its axial movement, the anchoring member also performs a rotary movement.

In addition to the above-described arrangement, it is also known to introduce the adhesive components directly into the borehole by means of an injection device. Because of the short period in which the components are workable, it is customary to mix them together only after they are introduced into the borehole. Accordingly, satisfactory results can be achieved with this arrangement only if a rotating anchoring member is employed.

Due to the rotary movement required in each of the above examples, the anchoring member is usually inserted by means of a hand tool, for example, a hammer drill. Such a hand tool imparts axially directed blows to the anchoring member as well as applying a rotary movement. On construction sites, however, such machines are available only to a limited extent so that it is uneconomical to use such apparatus for setting adhesively secured anchoring members. Furthermore, the engagement and disengagement of the hand tool to the anchoring members is disadvantageous, because of the time expended.

Therefore, it is a primary object of the present invention to provide both a method of and an apparatus for inserting an anchoring member into a borehole and adequately mixing the adhesive components which secure the member within the hole without using any special hand tools or similar equipment.

In accordance with the present invention, an anchor assembly is provided which includes an anchoring member and a guide ring through which the member is driven axially into a borehole. One of the anchoring member and the guide ring is provided with a helical projection while the other has a helically arranged groove into which the projection interengages so that axial movement applied to the outer end of the anchoring member is transformed into rotary movement as the anchoring member moves relative to the guide ring.

In accordance with the method of the present invention, because of the forced guidance of the anchoring member, an additional rotary movement is imparted to the anchoring member as it is driven axially into a borehole. No elaborate means are required for setting the adhesively secured anchoring member in place and the anchoring member can be driven in using an ordinary hammer. Further, the guide ring through which the anchoring member is driven, bears on the surface of the receiving material and prevents the adhesive from escaping from the borehole.

The apparatus or structure used in carrying out the method includes a helically extending thread-like formation along an axially extending shank part of the anchoring member and a guide ring positioned on the shank part so that the anchoring member can be axially displaced through it and with the inside surface of the guide ring having a formation complementary to the thread-like arrangement on the shank part so that the ring and shank-part interengage. As the anchoring member is driven axially through the guide ring the rotary movement of the member is produced by the interengagement of the formation on the inner surface of the ring with the thread-like arrangement on the anchoring member. Additionally, the guide ring can serve to strip dirt from the outer surface of the anchoring member as it passes through the ring.

The front end of the anchoring member can be formed as a hollow cylinder for receiving an adhesive cartridge containing the adhesive material or its separate components. Further, a displaceable plunger can be provided in the hollow cylinder portion of the anchoring member for displacing the adhesive cartridge into a borehole. The plunger can have a length corresponding to that of the anchoring member and it can be guided in the bore or surface within the hollow cylinder. Accordingly, the adhesive can be displaced from the interior of the anchoring member into the borehole as the first step of the setting operation as the plunger is displaced through the bore within the anchoring member. When the rear end of the plunger is flush with the rear end of the anchoring member the member can be driven axially by applying blows to its rear end and the interaction of the member with the ring guide provides the requisite rotary movement. The guide ring can be supplied already mounted on the front end of the shank part of the anchoring member.

It is expedient if the thread-like arrangement on the anchoring member is in the form of at least one helical groove with the inner surface of the guide ring having projections which correspond in shape to the helical groove. While the cross section of the helical groove may have any form, it is advantageous if it is not too sharp-edged. With such an arrangement, the anchoring member is relatively insensitive against blows and fouling. The projections on the guide ring can also be formed by individual pins or protrusions extending inwardly into the bore through the guide ring. The helical grooves in the anchoring member can be produced by a cutting operation or by non-cutting deformation. Non-cutting deformation is preferable, because it results in a strengthening of the surface of the member.

It is also advantageous if the helical thread-like arrangement on the anchoring member is in the form of helical fins with the inner surface of the guide ring being formed with helical grooves corresponding to the fins. The fins on the surface of the anchoring member assures a better mixing of the adhesive components within the borehole. For reasons of strength, it is advisable to form the fins by a non-cutting deformation of the anchoring member. If the anchor assembly involves considerable dimensions, it is possible to weld a wire coil on the smooth surface of the anchoring member to provide the helical projection or to join the wire coil to the member in some other way.

To ensure rotation of the anchoring member under different friction conditions and, at the same time, to avoid rotation of the guide ring, it is advantageous to select the angle of inclination of the helical threads so that they form an angle of at least 30°. Furthermore, to prevent rotation of the guide ring, its outer surface which bears against the receiving material can be roughened or provided with prong-like projections which engage the surface of the receiving material.

To limit the penetration of the anchoring member independent of the depth of the borehole, it is advisable to provide a stop along the axial extent of the anchoring member. As a result, the driving operation is completed when the stop contacts the guide ring. With the normally existing play between the guide ring and the anchoring member the stop ensures a perpendicular seating of the anchoring member against the guide ring and thus positions the anchoring member perpendicularly to the surface of the receiving material. To improve the guidance of the anchoring member through the guide ring it is advantageous if the ring is designed as a combined sleeve and collar with the sleeve acting as a plug-shaped part which fits closely within the borehole with the collar at one end of the sleeve extending radially outwardly from the sleeve and thus having a larger outside diameter than the borehole. With this arrangement the length of the guiding surfaces can be increased without affecting the visual appearance of the anchor assembly. By a corresponding formation of the guide ring, it is also possible to secure the guide ring until the adhesive material hardens within the borehole. This feature can be achieved by providing a slight conically tapering configuration within the bore of the sleeve with the bore tapering in the driving direction of the anchoring member. As the anchoring member is driven into the borehole, the part of the sleeve within the borehole is expanded outwardly into contact with the borehole surface. This feature prevents rotation of the guide ring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the Drawing:

FIG. 1a is a side view, partly in section, of an anchor assembly, which uses an adhesive material for securing an anchoring member within a borehole, and the anchoring member is shown in position to be driven into a borehole;

FIG. 1b is a view similar to FIG. 1a, viewed in the direction of the arrow Ib in FIG. 1a, with the anchoring member fully driven into the borehole;

FIG. 1c is an end view of an alternative embodiment of the guide ring.

FIG. 3a is an end view of another form of the guide ring.

FIG. 3b is a side view of the guide ring of FIG. 3a.

DETAIL DESCRIPTION OF THE INVENTION

Figure 2A:
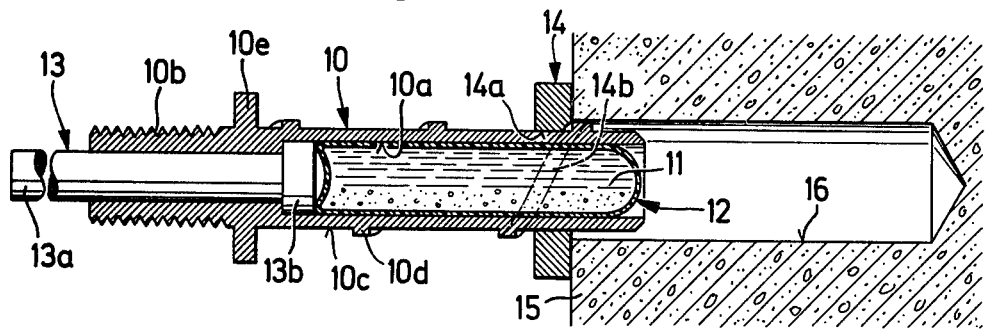
FIG. 2a is a side view partly in section, of another anchoring assembly embodying the present invention with the anchoring member ready to be inserted into a borehole.

In FIG. 1a an anchor assembly is shown including an anchoring member 1 ready to be inserted into a borehole 4 formed in a hard receiving material, such as concrete where it is to be secured in place by a hardenable adhesive material. The anchoring member 1 has an axially elongated substantially cylindrical shank portion 1a in which a helical groove 1b is formed for its axial length. The helical groove 1b has a substantially semi-circular cross section. At its front end, that is the end first inserted into the borehole 4, the anchoring member 1 is wedge-shaped with a cutting edge 1c extending transversely of the axial direction of the member. At its rear end, that is the end more remote from the borehole, the anchoring member has a threaded portion 1d. To protect the threaded portion 1d against damage by axial blows directed against the rear end of the member, a plug 1e is formed in and extends axially outwardly from the rear end of the threaded portion 1d. The plug 1e can be integral with the anchoring member 1 or it can be formed of a different material and inserted into the member. The outer surface of threaded portion 1d is slightly smaller in diameter than the outside diameter of the shank portion 1a so that an annular shoulder 1f is formed at the rear end of the shank portion. Screwed onto the threaded portion 1d is a stop 2 in the shape of an annular disc provided on its interior surface with a corresponding female thread. When it is fully threaded onto the anchoring member, the disc-shaped stop 2 bears against the shoulder 1f. Stop 2 limits the axial insertion of the anchoring member into the borehole. Mounted on the front end of the anchoring member 1, that is the end having the cutting edge 1c, is a guide ring 3. Guide ring 3 consists of a sleeve-like part 3a with a collar 3b extending radially outwardly from the outer surface of the sleeve-like part. The sleeve-like part has an outside diameter corresponding to the diameter of the borehole 4 so that it can be inserted into the borehole at the commencement of the process of inserting the anchoring member. Since the collar 3b has a greater outside diameter than the sleeve-like part 3a it bears against the surface of the receiving material 5. The bore through the guide ring has a slightly conically shaped configuration tapering inwardly in the driving direction of the anchoring member and the bore has projections 3c shaped complementary to the helical groove 1b in the surface of the shank portion 1a of the anchoring member. As can be seen in FIG. 1a the projections 3c interengage the helical groove 1b so that a forced rotary movement is imparted to the anchoring member about its longitudinal axis as it is driven axially into the borehole. To facilitate the radial widening of the sleeve-like portion 3a of the guide ring, it is provided with axially extending slots 3d.

In FIG. 1b the anchoring member 1 is shown fully inserted and secured within the borehole 4. The anchoring member has been driven axially into the borehole until the stop 2 bears against the outer surface of the collar 3b on the guide ring 3. Knurling 3e is provided on the outer surface of the sleeve-like part 3a of the guide ring which fits into the mouth of the borehole and the knurling prevents rotation of the guide ring as the anchoring member is driven in. The sleeve-like part 3a of the guide ring widens radially outwardly as the front end of the anchoring member is driven through it. As the anchoring member is driven into the borehole, the components of the adhesive material, previously introduced, for example, by means of a cartridge of destructible material or by means of a device injecting the components directly into the borehole, are mixed with one another by the cutting edge 1c. The surfaces of the guide ring 3 bearing on the receiving material 5 prevents the adhesive material 6 from flowing out of the borehole 4. Further, helical groove 1b in the shank portion 1a of the anchoring member produces an additional form locking effect between the anchoring member and the layer of adhesive material 6 enclosing it. Instead of a male thread on the threaded portion 1d, the rear end of the anchoring member 1 could be provided with a female thread or with other means for securing the part to be secured onto the anchoring member.

In order to prevent rotation of the guide ring, its outer surface which bears against the receiving material can be roughened, as shown in FIG. 1c, or provided with prong-like projections which engage the surface of the receiving material, as shown in FIGS. 3a and 3b.

Figure 2B:
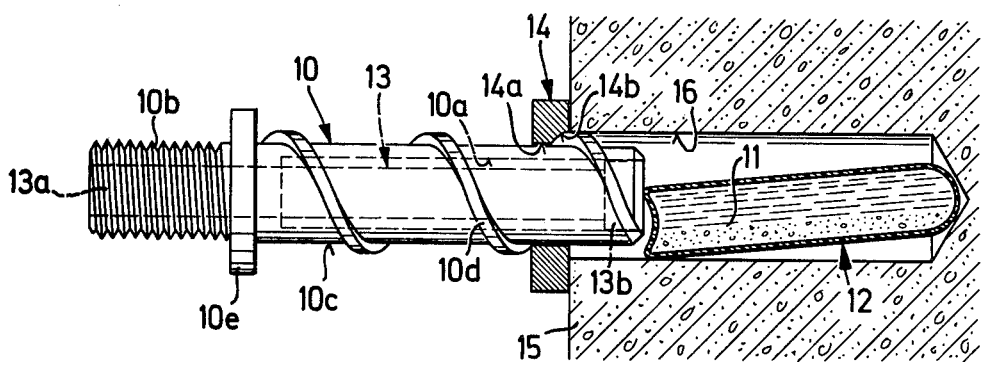
FIG. 2b is a view similar to FIG. 2a, however, showing the adhesive cartridge displaced from the anchoring member into the borehole.

In FIG. 2a another embodiment of an anchoring member secured by adhesive material into a borehole is illustrated. Anchoring member 10 has an axially extending through-bore 10a. The forward portion of the through-bore, that is the portion within the anchoring member which is inserted into the borehole, has a slightly greater diameter than the rear portion and an adhesive cartridge 12 containing the components of the adhesive material 11 are fitted into the forward portion. Within the rearward portion of the bore 10a is a plunger 13. The length of the plunger corresponds to the length of the anchoring member 10 and in the arrangement shown in FIG. 2a the plunger extends axially rearwardly from the anchoring member. The rear part 13a of the plunger has a diameter corresponding to the rearward part of the bore 10a and it has an enlarged head 13b at its forward end which, as shown in FIG. 2a, is located at the rearward end of the forward portion of the bore 10a. As illustrated, the head 13b bears against the rearward end of the cartridge 12. The outer surface on the rearward end of the anchoring member is provided with a male thread 10b and its forward shank portion 10c has outwardly extending helical fins 10d. Between the shank portion 10c and the male thread 10b is an outwardly projecting collar-like stop 10e which is formed integrally with the anchoring member. As seen in FIGS. 2a and 2b, a guide ring 14 is positioned on the outer surface of the anchoring member adjacent its forward end, that is the end inserted into the borehole. The guide ring 14 bears against the surface of the receiving material 15 and provides guidance for the anchoring member 10 as it is driven into the borehole. The guide ring 14 has a bore 14a in which a helical groove is formed complementary to the helical fin 10d on the anchoring member.

In FIG. 2b, the cartridge 12 of adhesive material has been displaced from the front end of the anchoring member into the borehole 16. This insertion of the cartridge is effected by directing axial blows against the trailing end of the rear part 13a of the plunger with its head 13b displacing the cartridge 12 from the bore 10a. When the trailing end of the rear part 13a of the plunger 13 is flush with the rearward end of the anchoring member 10, the head 13b of the plunger effects a closure of the forward end of the bore 10a within the anchoring member, that is, it closes off the end of the bore 10a which opens into the borehole 16. Additional axial blows are now exerted directly against the anchoring member itself. Due to the forced guidance afforded by the guide ring 14, a rotary movement is imparted to the anchoring member as it is driven into the borehole. The closed forward end of the anchoring member breaks the cartridge 12 and the components of the adhesive material 11 contained within it are mixed with each other and distributed throughout the borehole 16.

Figure 2C:
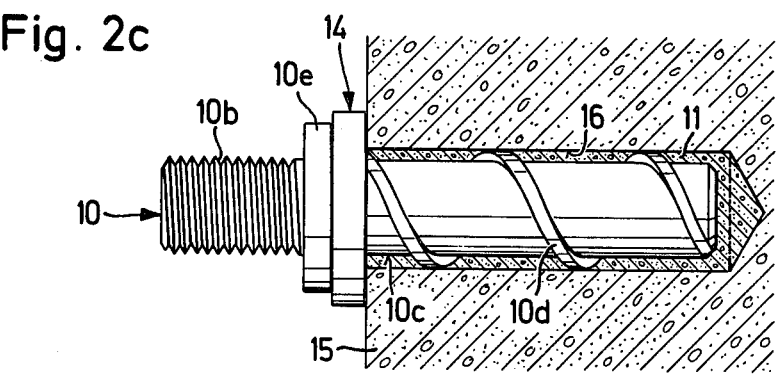
FIG. 2c is a view similar to FIG. 2a with the anchoring member fully inserted into the borehole.

In FIG. 2c the anchoring member is shown fully inserted into the borehole. The process of setting the anchoring member is completed when its stop 10e strikes against the guide ring 14. The helical fins 10d provide additional guidance for the anchoring member 10 within the borehole 16. With a suitable receiving material 15, as well as corresponding dimensioning of the borehole 16, it is possible that the anchoring member has achieved a limited anchoring value in the borehole before the adhesive material 11 hardens. Further, the helical fins 10d provide a form-locking bond with the hardened adhesive material 11. The male thread 10b on the trailing end of the anchoring member serves to secure the object to be anchored.

While specific embodiments of the invention have been shown and described in detail to illustrate the application of the inventive principles, it will be understood that the invention may be embodied otherwise without departing from such principles.

What is claimed is:

1. A method of securing an anchoring member within a borehole in a receiving material by the use of a hardenable adhesive material where the borehole has a diameter greater than the diameter of the anchoring member including the steps of placing an adhesive material within the borehole and before it hardens, inserting a guide ring into the borehole, inserting an anchoring member through the guide ring and into the borehole, and using the movement of the anchoring member into the borehole for mixing the adhesive material so that it hardens and secures the anchoring member within the borehole, wherein the improvement comprises the steps of inserting the anchoring member into the borehole by applying solely an axially directed force to the anchoring member and converting the axially directed force into a combined axially directed and rotatably directed force by means of cooperating helical means on the guide ring and the anchoring member, thereby rotating the anchoring member as it is inserted axially into the borehole while maintaining the anchoring member out of interengagement with the surface of the borehole and, consequently, distributing the adhesive material throughout the borehole.

2. In an anchor assembly comprising an anchoring member and a hardenable adhesive material for securing said anchoring member within a borehole in a hard receiving material, such as concrete, wherein the improvement comprising that said anchoring member having an axially elongated shank portion arranged to be inserted into the borehole with said shank portion having an outside diameter less than the diameter of the borehole so that a space is provided between the surface of said shank portion and the surface of the borehole for receiving said adhesive material, a guide ring fitted on said shank portion and having an inside diameter substantially equal to the outside diameter of said shank portion so that the shank portion can be axially displaced through said guide ring and an outside diameter greater than the diameter of the borehole so that at least a portion of said guide ring remains exteriorly of the borehole in the receiving material, one of the outer surface of said shank portion and the inner surface of said guide ring having at least one helically arranged protrusion and the other one having a helical groove shaped to complement and to interengage said protrusion so that as said shank portion is axially displaced through said guide ring the interengagement of said protrusion and groove convert axial movement imparted to said anchoring member into a combined axial and rotating movement within the borehole for implementing the mixing of said adhesive material.

3. In an anchor assembly, as set forth in claim 2, wherein said helically arranged protrusion comprises a helically arranged projection on the inner surface of said guide ring and said helical groove being formed on the outer surface of said shank portion.

4. In an anchor assembly, as set forth in claim 2, wherein said helically arranged protrusion comprises outwardly projecting helical fins formed on the outer surface of said shank portion and said helical groove being formed in the inner surface of said guide ring.

5. In an anchor assembly, as set forth in claim 2, wherein said helical grooves having a pitch angle of at least 30°.

6. In an anchor assembly, as set forth in claim 2, wherein said anchoring member includes an attachment portion extending axially from one end of said shank portion, a stop member mounted on and extending radially outwardly from said anchoring member at the juncture of said attachment portion and shank portion.

7. In an anchor assembly, as set forth in claim 2, wherein said guide ring comprises an axially extending sleeve portion and a collar portion secured to one end of said sleeve portion and extending radially outwardly from the radially outer surface of said sleeve portion, and said sleeve portion arranged to be inserted in closely fitting engagement into the borehole in the receiving material and said collar portion arranged to contact the surface of the receiving material and acting as a stop for any further insertion of the sleeve portion into the borehole.

8. In an anchor assembly, as set forth in claim 7, wherein the inner surface of said sleeve part being disposed in converging relationship in the direction extending away from said collar part and the end of said shank portion remote from said attachment portion having diverging surfaces extending from the remote end so that the remote end of said shank portion expands said sleeve portion when said anchoring member is displaced through said guide ring.

9. In an anchor assembly, as set forth in claim 6, wherein said attachment portion being threaded in the axial direction of said anchoring member.

10. In an anchor assembly, as set forth in claim 6, wherein a plug formed in the end of said attachment portion remote from said shank portion and extending axially outwardly from the remote end of said attachment portion.

11. In an anchor assembly, as set forth in claim 2, wherein said anchoring member having a front end which is displaced through said guide ring and an oppositely disposed rear end, said anchoring member having a bore extending axially therethrough from said front end to said rear end, and a plunger located in said bore and axially displaceable therethrough toward said front end.

12. In an anchor assembly, as set forth in claim 11, wherein said bore in said anchoring member having a first section extending from said front end toward said rear end and terminating intermediate the front and rear ends of said bore and a rear section extending from said rear end to the end of said first section intermediate the ends of said bore, said front section having a larger diameter than said rear section and said plunger having a head at its end closer to the front end of said bore and said head having a larger diameter than the rear portion of said bore and being displaceable through the front portion of said bore so that it can dislodge an element positioned within the front portion of said bore.

13. In an anchor assembly, as set forth in claim 12, wherein said plunger has an axial length of the same length as said anchoring member so that said head on said plunger forms a closure for the end of said first section of said bore located at the front end of said anchoring member when said plunger is displaced through said bore in said anchoring member so that its rear end is located at the rear end of said anchoring member.

14. An anchoring member, as set forth in claim 13, wherein a cartridge containing at least two separate components of the adhesive material which are hardenable when mixed together being positioned within the first section of said bore in said anchoring member and being displaceable therefrom by said plunger.

15. In an anchor assembly, as set forth in claim 7, wherein the radially outer surface of said sleeve portion of said guide ring being knurled.

16. In an anchor assembly, as set forth in claim 6, wherein the end of said shank portion of said anchoring member spaced from said attachment portion being wedge-shaped and terminating in a cutting edge extending transversely of the axial direction of said anchoring member.

17. In an anchor assembly, as set forth in claim 8, wherein said sleeve part of said guide ring having at least one axially extending slot therein facilitating the expansion of said sleeve part within the borehole.

18. In an anchor assembly, as set forth in claim 2, wherein said guide member having a surface extending transversely of the axial direction of the shank portion of said anchoring member and arranged to contact the surface of the receiving material in which the borehole for said anchoring member is formed, and said surface of said guide member being roughened to prevent rotation of said guide member about the axis of the shank portion of said anchoring member.

19. In an anchor assembly, as set forth in claim 2, wherein said guide member having a surface extending transversely of the axial direction of the shank portion of said anchoring member and arranged to contact the surface of the receiving material in which the borehole for said anchoring member is formed, and prong-like projections formed on and extending outwardly from said surface of said guide member for preventing rotation of said guide member around the axis of the shank portion of said anchoring member.

* * * * *